Sept. 12, 1950　　　J. E. ANDERSON　　　2,522,205
TOY STEERING WHEEL
Filed July 15, 1946

Inventor
Jimmie Edward Anderson
By Fishburn & Mullendore,
Attorneys

Patented Sept. 12, 1950

2,522,205

UNITED STATES PATENT OFFICE 2,522,205

TOY STEERING WHEEL

Jimmie Edward Anderson, Pryor, Okla.

Application July 15, 1946, Serial No. 683,624

1 Claim. (Cl. 46—1)

This invention relates to an amusement device, and more particularly to a toy steering wheel adapted to be attached to the dash or back of the front seat of an automobile or other vehicle.

The principal objects of the present invention are to provide an amusement device for children riding in an automobile, truck or the like, by which they may mimic the driver of the vehicle; to provide means for attaching the device to the instrument board or dash of the automobile or vehicle; to provide a device of this character which may be attached to the forward seat in a multiple seat vehicle; to provide means for attaching the device to a chair or the like; and to provide a device of this character simple, economical to manufacture and efficient in operation.

In accomplishing these and other objects of the present invention, I have provided improved details of structure, the preferred forms of which are illustrated in the accompanying drawings wherein:

Fig. 5 is a perspective view of a further modified form of the invention for attachment to the back of the front seat of a vehicle, chair or the like.

Figure 1:
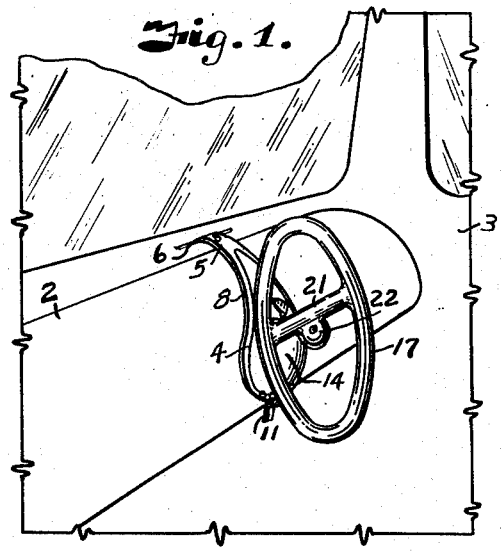
Fig. 1 is a perspective view of my invention showing the device attached to the dash of a motor vehicle.

Referring more in detail to the drawings:

1 designates an amusement device embodying the features of my invention showing the same attached to an instrument panel or dash 2 of an automobile or the like 3. The device consists of a body member 4 having a narrowed end 5 bent to form a hook 6 adapted to engage in an opening 7 of the dash 2. The device is particularly adapted so that the hook 6 will engage in the defroster vent usually provided in vehicles of this character. The body member 4 is tapered outwardly as indicated at 8 (Fig. 1) to substantially semi-circular shape as best illustrated in Fig. 2.

Figure 3:
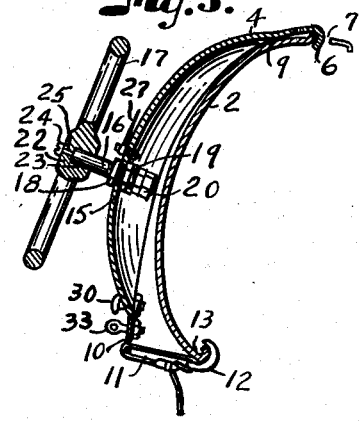
Fig. 3 is a vertical cross section through the device.

The body member 4 is bent to conform to the contour of the instrument panel of the vehicle as illustrated in Fig. 3. The narrowed portion contacts the dash 2 as indicated at 9 (Fig. 3) and the body member will be held outwardly from the dash 2 to accommodate the steering post as will later be described.

The lower end of the body member 4 is provided with an opening or slot 10 adapted to receive a strap or the like 11 carrying a hook 12 adapted to engage under the lower edge of the instrument panel or dash 13 to securely anchor the body member to the dash.

The body member 4 is provided at substantially the center of the enlarged portion 14 with an opening 15 adapted to receive a post 16 for a steering wheel 17. The inner end of the post 16 is threaded and adapted to receive a sleeve 18 for engaging in the opening 15 so that the post 16 will rotate freely within the sleeve. The post is held in the body member 4 by lock nuts 19 and 20 as best illustrated in Fig. 3. The wheel 17 is provided with a cross arm 21 having a hub 22 provided with a recess 23 adapted to receive the outer end of the post 16. The post 16 is provided with an internally threaded opening adapted to receive a set screw or the like 24 extending through an opening 25 in the hub 22 of the steering wheel to retain the wheel on the post.

To simulate the appearance of an ordinary steering wheel and instrument panel, the body member is provided with a speedometer dial 26 having a pointer 27 and other gauges or indicators 28 and 29 which may be stamped, stenciled or otherwise traced on the body member, such as by decalcomania transfer or the like.

The lower edge of the body member is provided with the usual throttle 30, choke 31, light switch 32 and ignition key 33, further simulating the instrument panel of a motor vehicle.

In using a device constructed and assembled as described, a child riding in the automobile in the seat next to the driver may amuse himself by turning the steering wheel, operating the controls and otherwise mimicking the driver to suit his fancy.

Figure 2:
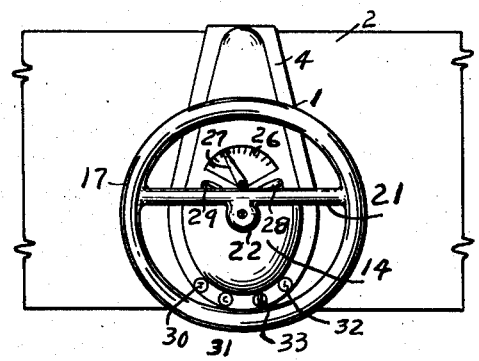
Fig. 2 is a front elevational view of the device showing the device attached to the instrument panel.
Figure 4:
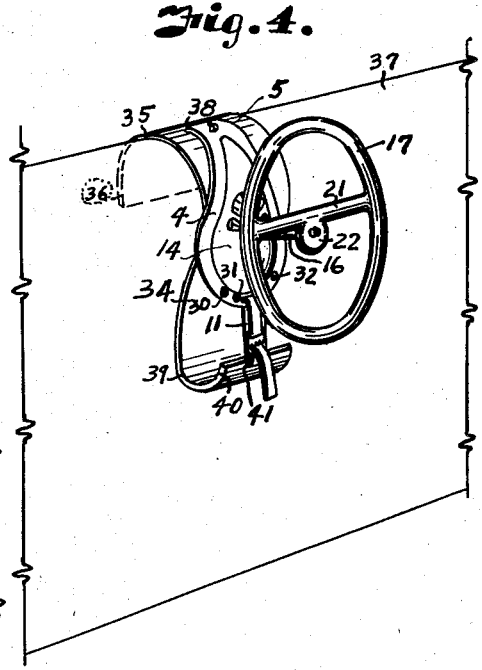
Fig. 4 is a perspective view of a modified form of the invention adapted for attachment to the back of the front seat of a vehicle.

Referring to the form of invention shown in Fig. 4, the body member 4 is substantially similar to that shown in Figs. 1 to 3 inclusive, as well as the steering wheel 17 and the manner of mounting the same on the body member. This form of invention is particularly adaptable for engaging the back of the front seat of a multiple seat vehicle and comprises an anchoring member or bracket 34 having its upper end curved as indicated at 35 to form a hook member 36 adapted to engage over the back of the seat 37. The anchoring member is provided near the bent portion 35 with a slot 38 adapted to receive the hook end 6 of the body member 4. The bracket member 34 is bent in somewhat the shape of a figure S having its lower end curved as indicated at 39 to form a hook 40 having a slot 41 for receiving the strap 11 to secure the body member 4 to the bracket member.

Figure 5:
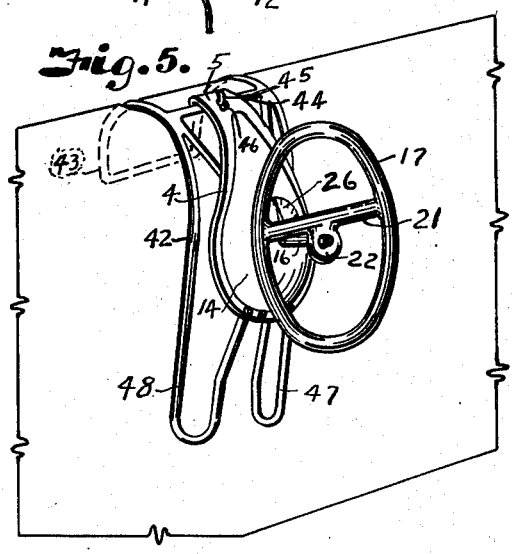

Fig. 5 illustrates a further modified form of invention in which the bracket 42 is shown to be made of wire welded to form an anchoring member for the body member 4, the upper end of the wire being bent as indicated at 43 to engage the back of the seat of a vehicle and comprising a framework having a cross bar 44 provided with a hook 45 adapted to engage in an opening 46 in the narrowed portion 5 of the body 4, the hook portion 6 of the body member engaging over the cross bar 44 to securely anchor the body member to the bracket 42. The bracket member is provided with downwardly extending portions 47 and 48 adapted to engage the back of the seat of the vehicle.

Operation of the device as illustrated in Figs. 4 and 5 is the same as illustrated in the form of invention shown in Figs. 1, 2 and 3.

While my device may be made from any suitable material, such as spring steel, aluminum, plastic or the like, I do not wish to be limited to any particular material as it will be obvious that various materials will be suitable for my purpose.

It will be obvious from the foregoing that I have provided an improved amusement device which may be quickly and easily attached to and detached from a motor vehicle or the like.

It will further be obvious that the form of invention illustrated in Figs. 4 and 5 may be adapted for engagement to the backs of chairs or other articles as desired.

What I claim and desire to secure by Letters Patent is:

An amusement device of the character described adapted to be attached to the dash of a motor vehicle having a defroster vent comprising, a base bent to substantially conform to the contour of said dash and having a hook on one end adapted to engage in said vent, said base having a slot in its other end, a flexible strap engaging in said slot, a hook carried by said strap for engaging the lower edge of said dash for adjustably securing the base member rigidly to said dash, a post secured to said base, and a steering wheel secured to said post.

JIMMIE EDWARD ANDERSON.

REFERENCES CITED

The following references are of record in the file of this patent:

UNITED STATES PATENTS

| Number | Name | Date |
|---|---|---|
| 1,556,076 | Chambers | Oct. 6, 1925 |
| 1,679,715 | Fish | Aug. 7, 1928 |
| 1,778,771 | Pritchard | Oct. 21, 1930 |
| 1,922,746 | Reeder | Aug. 15, 1933 |
| 2,148,828 | Myers | Feb. 28, 1936 |
| 2,270,948 | Howe | Jan. 27, 1942 |